March 24, 1953 W. T. CRESPINEL 2,632,815
MEANS FOR RECORDING ELECTRIC SIGNALS
Filed July 2, 1949
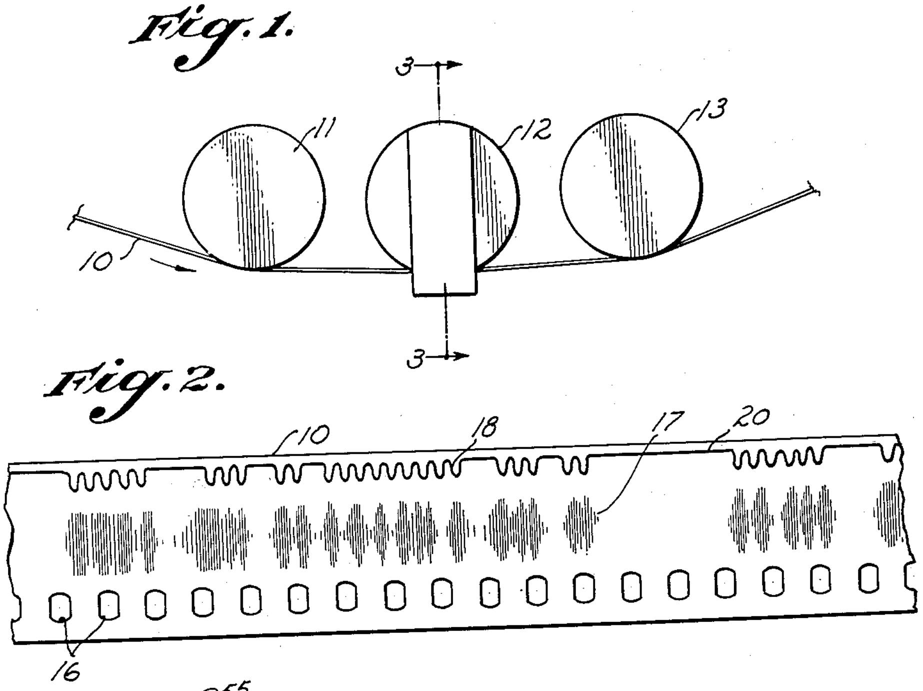
Fig. 1. Fig. 2.
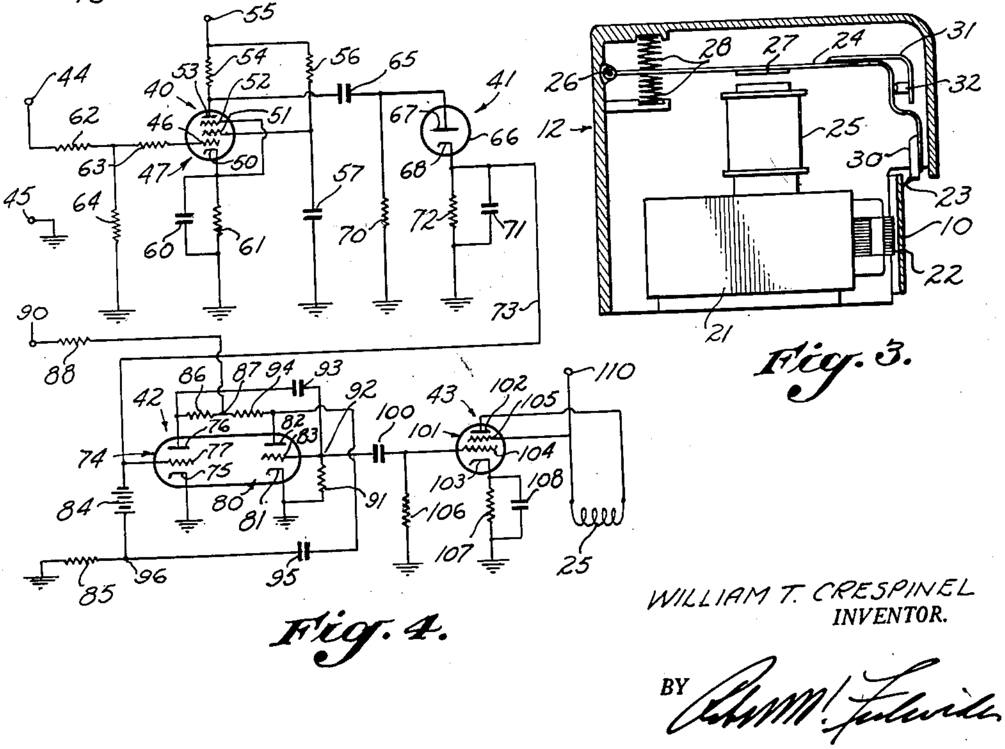
Fig. 3.
Fig. 4.
WILLIAM T. CRESPINEL
INVENTOR.
BY [signature]
ATTORNEY Patented Mar. 24, 1953 2,632,815

UNITED STATES PATENT OFFICE 2,632,815

MEANS FOR RECORDING ELECTRIC SIGNALS

William T. Crespinel, Burbank, Calif.

Application July 2, 1949, Serial No. 102,920

2 Claims. (Cl. 179—100.2)

My invention relates generally to the magnetic recording of sound or other signals, and more particularly to a method and apparatus for providing the record material, such as tape, with a visible record in addition to the invisible magnetic record.

In the production and recording of radio programs, particularly in the case of "on the spot" or audience participation programs, it has been found desirable to record a program lasting a considerable longer period of time than the final, finished program is to last. Later, the record is reproduced, and the decision is made as to which portions of the record to delete or cut out. Most of these programs are recorded on magnetizable tape, and while it is a simple matter to cut and splice the tape, determining the location of such a cut is more difficult.

It is customary for the person editing or cutting the tape to have a transcript of the recorded program that he may visually follow while listening to the reproduction. However, if it is desired to make a cut between two words that follow each other within a very small fraction of a second, difficulty may be experienced in locating the cut between the words and not in one of the words. As a result, a rather high degree of skill is required in such work, and the process is rather time consuming.

If a visual record of the sound were formed on the tape at the same time that the magnetic recording is made, cutting and editing of such tapes would be materially simplified. However, it is impractical to attempt to type or print the spoken words on the tape at the time of their original recording.

It is therefore a major object of my invention to provide an improved method and means for magnetically recording sound or other electric signals on tape in which a visual record of the sound or signal is simultaneously formed.

Another object of my invention is to provide such a method and means that furnishes a visible record whenever the magnitude of the sound or other signal exceeds a predetermined value.

It is a further object of my invention to provide a means for practicing this method that is simple in operation and may easily be used by a previously inexperienced person with only a small amount of training.

Still another object of my invention is to provide a means for this type that produces a clear and readily intelligible record regardless of the volume or frequency of the signal, so long as the magnitude of the signal exceeds a predetermined minimum.

It is a still further object of my invention to provide simple and inexpensive method and means for accomplishing these results that are readily constructed and used to produce accurate and dependable results.

These and other objects and advantages of my invention will become apparent from the following description of a preferred form thereof, and from the drawings illustrating that form in which Fig. 1 is a plan view of a magnetic recording device constructed in accordance with my invention;

Fig. 2 is a view of a magnetic tape of the type commonly used, with both an invisible magnetic record and a visible record indicated thereon;

Fig. 3 is a cross-sectional view taken on the line 3—3 of Fig. 1, showing the apparatus used in the visual recording of the sound on the tape; and Fig. 4 is a schematic wiring diagram indicating one method of connecting various elements to provide the type of visible record I have found preferable.

Referring now to the drawings and particularly to Fig. 1 thereof, the numeral 10 indicates generally a magnetic tape of any of the well-known types, mounted on a magnetic recorder, of which only a portion is shown. While the exact location and arrangement of various parts of the recorder are not too important, it is customary for the tape 10 to be removed from a feed roll (not shown), pass an erasing head 11 that effectively de-magnetizes the tape, move by a recording head 12, past a reproducing head 13, and then to a take-up reel (not shown). Drive rollers and tension rollers (not shown) are generally provided to move the tape in the proper manner, these elements being arranged in any suitable manner and their relative location being of no particular concern in the present invention. As indicated in the drawing, the tape 10 moves from left to right, in the direction of the arrow, and normally the erasing head 11 is energized only when a recording is to be made, and is not energized when the reproducing head 13 is to reproduce a previously recorded program.

While the tape 10 may take various forms, one widely used form includes a cellulose acetate base coated with a magnetizable material such as an iron powder, the powder being opaque and of a fairly dark color so that a white ink or paint will contrast therewith. Perforations 16 are preferably formed along one edge of the tape 10, and the overall appearance of the resulting product is not unlike that of 16 m. m. motion picture film. The magnetic recording is done in the central portion of the tape 10, and as well-known, produces no visible result that would be helpful in the editing of the tape. However, for clarity in illustration, I have indicated the invisible magnetic sound record as a series of transverse lines 17, it being understood that this is for purposes of illustration only and that the actual appearance of the tape 10 remains constant regardless of the presence or absence of the magnetic record.

In most magnetic recording devices making use of a tape of the character described, the tape may be arranged so that the perforations 16 thereof are along the lower edge of the tape, leaving a space along the upper edge suitable for receiving a visible record. This record, indicated in Fig. 2 by the numeral 18, may take any desired form but preferably is in the nature of a sawtooth or wave form of constant amplitude and frequency, formed in white ink or similar marking material for easy visibility. As previously mentioned, this visible wave occurs only when the sound recorded on the tape 10 exceeds a predetermined volume or intensity, and between these portions, there is a straight line 20.

To provide this record, the recording head 12 is furnished with the usual recording electromagnet 21 having pole pieces 22 that magnetize the tape 10 in the conventional manner. In addition, the recording head 12 has a pen or other marking instrument 23 mounted upon a movable arm or lever 24 that may be oscillated or vibrated by a separate electromagnet 25. Preferably, the arm 24 is pivotally connected to a mounting 26 attached to the housing of the recording head 12, with the electromagnet 25 intermediate the mounting and the pen 23 so that the arm acts to amplify or increase the movement of the pen over that directly provided by the electromagnet.

It would be possible, of course, for the electromagnet 25 to be connected directly to the audio output circuit of the recorder, in the same manner that the recording electromagnet 21 is connected. However, the sound being recorded very often has a frequency in the order of 1,000 cycles per second, and it is difficult to construct and build a mechanical system that will operate properly at this and other frequencies. Additionally, the amplitude or volume of the sound being recorded upon the magnetic tape 10 would likewise be indicated were the electromagnet 25 connected directly to the output circuit. For the purposes of editing the tape as described, the relative intensity of sounds is of comparatively little importance so long as the presence or absence of sound above a predetermined volume is indicated. A much simpler and more rugged mechanism can be constructed if the pen 23 and its operating mechanism are designed to work at a single predetermined frequency of constant amplitude, and consequently in my preferred form I have indicated such a device.

As best seen in Fig. 3, the arm 24 is provided with an armature 27 rigidly connected to the underside of the arm, aligned with the core of the electromagnet 25. The upper or horizontal portion of the arm 24 is sufficiently rigid to transmit any movement of the armature 27 to the pen 23, and springs 28 are mounted between the housing of the recording head 12 and the arm 24 to damp the latter and insure its faithful operation with respect to the impulses supplied by the electromagnet.

The free end of the arm 24 extends downwardly from the horizontal portion thereof and carries the pen 23 or other suitable indicating instrument as previously mentioned. If a pen is used, as is preferable, an ink reservoir 30 may conveniently be mounted on the end of the arm, and a wick or passageway provided to connect the reservoir to the pen. While I have shown the marking instrument as a pen 23, it will be apparent that a pencil, brush, or other means may be used, and I have used the expression "pen-type" to include these and other marking devices depositing a visible material on the tape 10.

It will be realized that the adjustment of the pressure exerted by the pen-type means 23 against the tape 10 is important, since insufficient pressure will provide an erratic record, while excessive pressure may cause sluggishness or sticking of the marking means. Consequently, I mount a bracket 31 on the free end of the horizontal portion of the arm 24, and provide an adjustable screw 32 or similar means in the bracket to bear against the depending portion of the arm 24 and flex the latter toward the tape 10. The bracket 31 is comparatively rigid, and consequently the depending portion of the arm 24 will be bent or flexed with respect to the horizontal portion thereof. It will be appreciated, of course, that the springs 28 are balanced to support the arm 24 together with the elements mounted thereon in such a manner that the armature 27 is normally spaced from the core of the electromagnet 25, thus insuring that the arm and the pen-type means will be moved downwardly whenever the electromagnet is energized.

In Fig. 4 I have shown a schematic wiring diagram of a circuit that may be used to provide the desired operating current for the pen electromagnet 25. Essentially, this circuit includes an amplifier stage 40 that receives and amplifies the signal from the microphone (not shown) or amplifier of the recorder, a rectifier 41 that changes the output of the amplifier 40 to pulsating direct current, an oscillator 42 whose operation is controlled by the output of the rectifier 41, and an amplifier 43 that amplifies the output of the oscillator 42. The output of the oscillator 42 is of a substantially constant frequency and amplitude, and it remains substantially constant regardless of the frequency or amplitude of the control signal delivered to it. In general, the construction and operation of these various elements is relatively unimportant, and various circuits shown in the art may be substituted for those shown.

However, I have found that the construction indicated in Fig. 4 operates to produce very satisfactory results, and therefore, while I do not wish to be limited to this particular circuit, it is shown as a preferred embodiment. As indicated in that figure, one output terminal of a microphone (not shown) or other source of electrical signals is connected to a terminal 44, while the other terminal of the microphone is grounded through a terminal 45. The terminal 44 is connected through appropriate resistors to a control electrode or grid 46 of an electron discharge tube 47, the latter preferably being of one of the readily available tubes such as the 6J7, having a relatively high amplification factor. Such a tube has a cathode 50, a screen grid 51, a suppressor grid 52 and an anode or plate 53 in addition to the control grid 46 previously mentioned. The anode 53 is connected through a resistor 54 to the positive terminal 55 of a power supply (not shown), and the same terminal of the power supply is connected through a resistor 56 to the screen grid 51. The other or negative terminal of the power supply (not shown) is connected to ground, and a capacitor 57 is connected between the screen grid 51 and ground. A capacitor 60 is connected between the cathode 50 and ground, while a resistor 61 shunts this capacitor. The previously mentioned resistors through which the microphone input terminal 44 is connected to the control electrode or grid 46 includes two series resistors 62 and 63 that are connected at their junction point through a resistor 64 to ground.

From the anode 53 of the electron discharge tube 47, a connection is made through a capacitor 65 to the rectifier 41, the latter including an electron discharge tube 66 that is preferably a diode rectifier of the type commercially available under the designation 6H6. Tubes of this type include an anode 67 and a cathode 68, and I connect the output from the capacitor 65 to the anode 67, while a resistor 70 is connected between the anode and ground. The cathode circuit includes a capacitor 71 connected between the cathode 68 and ground, while a resistor 72 shunts the capacitor. The cathode 68 may be considered as the output terminal of the rectifier 41, and the amplifier 40 and rectifier 41 thus cooperate to produce a pulsating direct current signal whenever an audio-frequency signal is impressed across the terminals 44 and 45.

From the output or cathode 68 of the rectifier 41, connection is made by a conductor 73 to the oscillator 42. The latter may be of any convenient type, but I have found that a simple oscillator based upon the well-known trigger circuit is very satisfactory. Such circuits are well-known and make use of a pair of electron discharge tubes that may conveniently be enclosed within a single envelope, permitting the use of a twin triode tube such as the commercially available 6SC7. Such a tube includes a first section 74 having a cathode 75, an anode 76, and a control electrode 77, while a second section 80 includes a cathode 81, an anode 82, and a control electrode 83. The conductor 73 is connected to the control electrode or grid 77 of the first section 74, and the grid is also connected through a source of biasing voltage such as a battery 84 and a resistor 85 to ground. The anode 76 is connected through a load resistor 86 to a junction point 87, the latter being connected through a resistor 88 to a terminal 90 that corresponds to or may be connected directly to the terminal 55 of the power supply. The cathode 75 is connected to ground, as is cathode 81 of the second section 80, but the latter is also connected through a resistor 91 to the control electrode 83 of the second section. A junction point 92 is formed at the connection of the resistor 91 and the control electrode 83, and this junction point is connected through a capacitor 93 to the anode 76 of the first section 74. The anode 82 of the second section 80 is connected through a resistor 94 to the previously mentioned junction point 87, and the oscillator circuit is completed by connecting the anode 82 of the second section 80 through a capacitor 95 to a junction point 96 formed by the connection of the battery 84 to the resistor 85.

The values I have selected for the various components of this oscillator circuit cause it to oscillate at a frequency of approximately 200 cycles per second, and it will be appreciated that so long as the voltage applied to the control electrode 77 of the first section 74 is sufficient to cause this oscillation, the magnitude of the voltage has no other effect upon the action of the oscillator. This is one of the characteristics of oscillators based upon the well-known trigger circuit that render this type of circuit very suitable for the present purposes.

The output of the oscillator 42 may be taken from the junction point 92 and connected through a capacitor 100 to the amplifier 43. The latter preferably includes an electron discharge tube 101 of the power amplifier type such as a 6L6, such tubes including an anode 102, a cathode 103, a control electrode or grid 104, and a screen grid 105. The capacitor 100 is connected to the control grid 104, and a resistor 106 is connected from the grid 104 to ground to insure that the proper bias voltage is applied to the grid. Similarly, the cathode 103 is connected through a resistor 107 to ground, this resistor being shunted by a capacitor 108, all in the conventional manner. The screen grid 105 is connected to a terminal 110 that corresponds to and may be connected to the positive terminal 55 of the power supply, and one terminal of the electromagnet 25 is likewise connected to the terminal 110. The other terminal of the electromagnet 25 is connected to the anode 102 so that the anode is connected in series with the electromagnet whereby variations in the current flowing through the electron discharge tube 101 will operate the electromagnet and the mechanically associated pen-type marker 23.

By way of example only and not as a limitation, I have found that if the circuit illustrated in Fig. 4 is constructed with components having the following values, very satisfactory results are obtained.

Resistors:

| | | |
|---|---|---|
| 54 | ohms | 500,000 |
| 56 | megohms | 3 |
| 61 | ohms | 2,200 |
| 62 | megohms | 3 |
| 63 | ohms | 200,000 |
| 64 | megohms | 2 |
| 70 | megohm | 1 |
| 72 | ohms | 250,000 |
| 85 | megohm | 1 |
| 86 | ohms | 50,000 |
| 88 | do | 100,000 |
| 91 | do | 250,000 |
| 94 | do | 50,000 |
| 106 | do | 500,000 |
| 107 | do | 170 |

Capacitors:

| | | |
|---|---|---|
| 57 | mfd | .1 |
| 60 | mfd | 25 |
| 65 | mfd | .005 |
| 71 | mfd | .1 |
| 93 | mfd | .02 |
| 95 | mfd | .02 |
| 100 | mfd | .1 |
| 108 | mfd | 25 |

From the foregoing, it is believed that the operation of the circuit shown in Fig. 4 will be readily understood. It will be appreciated that the battery 84 or other suitable source of power acts to bias the grid 77 or control electrode of the section 74 of the electron discharge tube so that when no signal or a very weak signal is received from the rectifier 41, the grid 77 is biased to prevent any operation of the oscillator 42. However, when the signal from the rectifier 41 exceeds a predetermined value, it overcomes the action of the power source 84 so that the oscillator 42 may then operate. As soon as the signal ceases, however, the control exerted by the biasing voltage of the battery 84 reasserts itself and further oscillation is stopped until such time as a signal of sufficient amplitude or intensity is again received from the rectifier 41. By way of example, I have found that if the battery 84 provides a potential of 15 volts, very satisfactory results are obtained. Some of the various elements and factors of the circuit will be changed, of course, by requirements of various mechanical systems and components of the mechanism operating the pen 23.

It will thus be seen that when a tape 10 is used in a recorder having my improved visual marking means therein, a record similar to the record 18 will be formed on the tape. When the person speaking into the microphone pauses, as between words or between sentences, a straight line 20 will be formed by the marker 23 as the latter is in its upper or released position. However, as words are spoken, the signals they generate will be amplified, rectified, and used to control the output of the oscillator 42 so that each individual word appears as a series of waves or sawtooth marks 18 formed by the vertical oscillation of the marker 23 as the tape 10 is moved beneath it. For spoken words to be intelligible, they must be of greater volume or intensity than other sound or noise occurring at the same time, and consequently any recorded program that is intelligible will have more energy concentrated in the words than in the background or incidental noise. This feature makes it possible for the voltage provided by the battery 84 to be adjusted so that the words will cause the operation of the oscillator 42, while the background or incidental noise will not. Therefore, by using this method of recording, it is a simple matter to determine the location and extent of a particular word on the tape, thereby greatly simplifying the editing of the recorded program. As a result, the editing may be done much more rapidly and efficiently, and the ability of the operator need not be so great.

It will therefore be seen that I have shown and described a method for providing magnetically recorded sound or other signals with a visible record, and have also shown a means for accomplishing this method that will clearly achieve the objects and advantages previously set forth. It will readily be seen that many changes may be made in the details of construction and in the method of practicing the invention, but the changes that will occur to those skilled in the art are within the scope of my invention. Consequently, I do not wish to be limited to the particular form, arrangement of parts, or sequence of operations herein described and shown, except as limited by my claims.

I claim:

1. A device for visibly recording upon a record gross variations in the effective amplitude of an invisible signal recorded upon the same record, which includes: drive means for moving said record past a fixed point; recording means for forming at said point an invisible record of an electrical signal; oscillator means operable to generate an oscillating control signal; amplitude responsive control means connected to said oscillator means and actuatable to operate said oscillator means; means for applying said electrical signal to said control means, said last-mentioned means including a rectifier, and said control means being actuatable by said electrical signal when the effective amplitude thereof exceeds a predetermined value; and marking means connected to said oscillator means for operation by said oscillating control current, said marking means being operable to apply visible indications to said record at said point, said indications representing the operation or non-operation of said oscillator means.

2. A device for recording an electrical signal and visibly recording gross variations in the effective amplitude thereof, which inclues: drive means for moving a magnetizable tape past a fixed point; recording means cooperable with said tape for magnetizing said tape at said point in accordance with the instantaneous amplitude of an electrical potential applied to said recording means; generator means operable to generate a control current; amplitude responsive control means associated with said generator means and actuatable to operate said generator means; means for applying said electrical signal to said control means, said control means being actuatable by said signal when the effective amplitude of said signal exceeds a predetermined value; and electro-mechanical indicating means connected to said generator means for operation by said control current, said indicating means being operable to apply visible indications to said tape at said point, said indications representing the operation of said generator means.

WILLIAM T. CRESPINEL.

REFERENCES CITED

The following references are of record in the file of this patent:

UNITED STATES PATENTS

| Number | Name | Date |
|---|---|---|
| 1,591,081 | Curtis | July 6, 1926 |
| 1,883,559 | Chipman | Oct. 18, 1932 |
| 2,178,641 | Neumann | Nov. 7, 1939 |
| 2,378,389 | Begun | June 19, 1945 |
| 2,436,503 | Cleveland | Feb. 24, 1948 |
| 2,561,476 | Lang | July 24, 1951 |

FOREIGN PATENTS

| Number | Country | Date |
|---|---|---|
| 65,471 | Norway | Nov. 9, 1942 |
| 177,647 | Switzerland | June 15, 1935 |
| 577,480 | Germany | May 31, 1933 |
| 618,349 | Great Britain | Feb. 21, 1949 |
| 877,470 | France | Dec. 8, 1942 |